E. L. Mix.
Carbureter.
N° 90,012. Patented May 11, 1869.
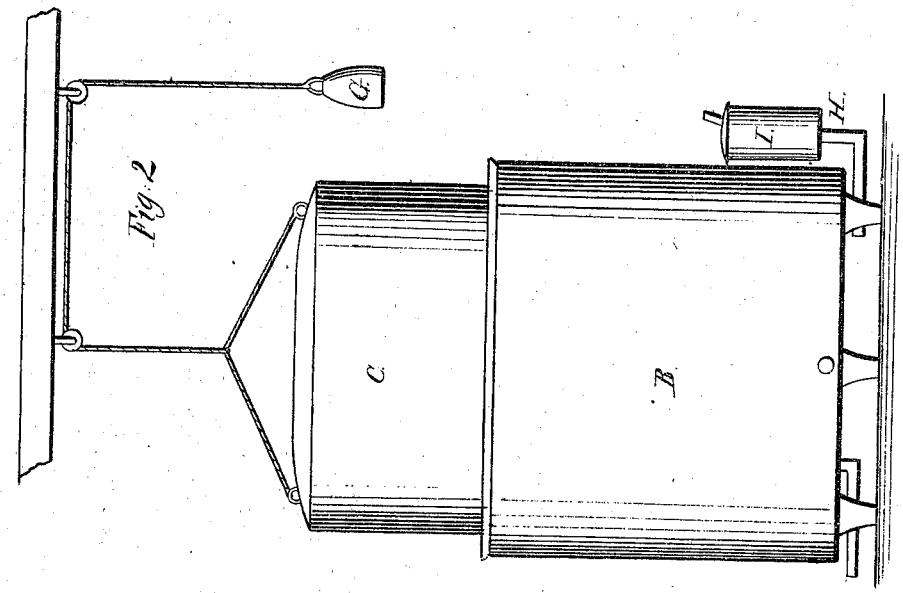
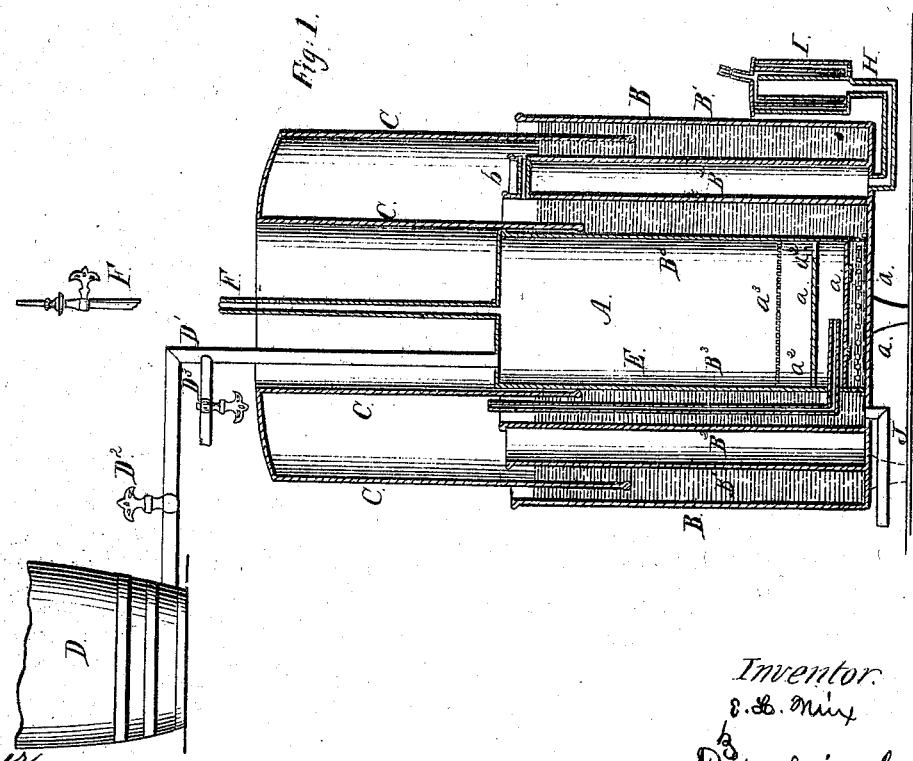
Witnesses:
Inventor.

United States Patent Office.

EDMON L. MIX, OF ROCHESTER, NEW YORK.

Letters Patent No. 90,012, dated May 11, 1869.

IMPROVED CARBURETTER.

The Schedule referred to in these Letters Patent and making part of the same.

*To all whom it may concern:*

Be it known that I, EDMON L. MIX, of Rochester, in the county of Monroe, and State of New York, have invented a new and useful Improvement in Carburetters; and I do hereby declare the following to be a full, clear, and exact description of the same, sufficient to enable others skilled in the art to which the invention appertains, to fully understand and use the same, reference being had to the accompanying drawings, which are made a part of this specification.

The subject of this invention is an apparatus for carburetting atmospheric air, thus to produce illuminating-gas, or to impregnate gas already made, with hydrocarbonaceous matter, in order to enrich and increase the brilliancy of the same.

My apparatus is of the kind in which an air-holder is made to gravitate within a water-tank, and thereby force the enclosed air, through a conducting-pipe, into the chamber containing the hydrocarbon-liquid, which, by the action of the air, is vaporized, and caused to combine with the air in such a manner as to form an illuminating-gas; and my improvements consist, essentially, of a tank, divided into three annular concentric spaces, the outer and inner ones containing water, and the intermediate one air, for the purpose hereafter set forth, in combination with an annular air-holder, and a carburetting-vessel, arranged centrally in the interior thereof, and in other features accessory thereto, as hereinafter described.

In the apparatus heretofore devised, the receptacle for the hydrocarbon-liquid, and the chamber to receive the impregnated air or gas, have been either separate and distinct compartments or vessels, submerged or enclosed within the water-tank, or a separate carburetter proper, situated outside of and at some distance from the water-tank and air-holder.

In my apparatus, the carburetting as well as the gas-receiving chamber, is the interior of a cylinder, which is situated centrally within the water-tank, so as to be enclosed by water at the sides and bottom, the top being exposed to the air. The water-tank is divided into two concentric chambers, having an intermediate air-space, to maintain an equable temperature, and the air-holder consists of two concentric and connected cylinders, adapted to the construction of the tank and carburetter.

Figure 1 is a vertical central section of an apparatus illustrating my invention.

Figure 2 is a side elevation of the same.

Similar letters of reference indicate corresponding parts in the several figures.

In the drawings—

A represents an upright vessel, of cylindrical or other form, situated centrally within a water-tank, B, and containing the oil or hydrocarbon-liquid to be vaporized.

The tank B is divided into three apartments, $B^1$ $B^2$ $B^3$, of which the outer and inner, $B^1$ $B^3$, contain water, while the intermediate apartment, $B^2$, contains a body of air, which, being a poor conductor, conduces to the maintenance of an equable temperature of the oil in the central chamber or vessel A.

Near the top of the water-tank is a tubular-conductor, $b$, affording communication between the apartments $B^1$ $B^3$ of the water-tank.

When it is desired to raise or lower the temperature of the oil in the vessel A, warm or cold water is supplied to the inner apartment, $B^3$, and the water which is thereby displaced, is conducted, by pipe $b$, into the outer apartment, $B^1$.

When hot water is used, it is introduced, by means of a pipe or other suitable conductor, into the chamber $B^3$, in the intervening space between the interior wall $C'$ of the air-holder, and the chamber A. Said pipe may lead from the kitchen or any convenient part of the dwelling, or other building in which my apparatus is used, so that it can be readily and conveniently supplied when required.

$a$ is the bottom proper of the oil-cylinder or carburetting-chamber A.

Said bottom $a$ stands somewhat above the bottom of the water-tank, and the intervening space communicates with the inner apartment of the water-tank, through the perforations $a^1$, in the lower extremity of the cylinder A, so that the water in the tank has access to the bottom as well as the sides of the carburetter, which is thereby rendered safe against fire.

The oil is supplied to the vessel A from an elevated reservoir, D, through the pipe $D^1$, which has a stopcock, $D^2$, between which and the carburetting-apparatus a short pipe, $D^3$, guarded by a stop-cock, communicates with the pipe $D^1$, in order that a hose, from a bellows or air-pump, may be applied to said pipe $D^3$, and made to supply air to the interior of the carburetting-chamber A, when there is an excess of the carbonaceous vapor therein.

C C' is the air-holder, consisting of two concentric cylinders, united at the top, designated, respectively, by the letters C C'.

The water-spaces of the water-tank B being properly charged with water, the air-holder is applied, so that the lower edge of the inner cylinder C' shall be submerged in the apartment $B^3$, and that of the outer cylinder C, in the apartment $B^1$.

The space between the cylinders C C' is tightly closed at top by the metal which connects said cylinders, but at bottom said space is of course open, and the cylinders are of course disconnected.

As the air-holder descends, it forces its enclosed air downward, through the pipe E, which discharges it into the cylinder or carburetter A, at a point between the bottom $a$ and a deflecting-disk, $a^1$, which is so supported that an annular space, $a^2$, is left between it and the sides of the cylinder A.

$a^3$ is a foraminated diaphragm, supported above the disk $a$, and employed to divide the ascending air into numerous fine jets, whereby the hydrocarbon-liquid is caused to effectively mingle with said air.

The disk $a$ deflects the air to the sides of the cylinder A, when it first enters the same, causing it to diffuse itself equally throughout the cylinder, and preventing it from concentrating at the centre.

The air ascends through the body of oil in the carburetter A, and being thus charged with the hydrocarbon-vapor, passes off, in the gas-pipe F, to the point where it is consumed.

The air-holder may be properly counterbalanced by the suspended weight G.

When the air-holder has completed its downward movement, it is recharged with air, through the pipe H, and said holder is either raised by pumping air into it, through pipe H, and apartment $B^2$, or by pulling down the weight G by hand, in which latter case it is only necessary to open the outer end of pipe H, and allow the air to enter.

The pipe H may be closed, while the apparatus is in operation, by a hydraulic joint or valve, I, which is the preferred means of effecting the closure when the air-holder is raised by hand.

When the air-holder is to be raised by pumping in air, a hose is applied to a tubular neck, $i$, on the external shell of the water-valve, or directly on the pipe H, said neck being closed by a plug or cock, when the apparatus is in operation, The water in the tank B may be drawn off through the cock J when desired.

It will be seen that this apparatus possesses several important advantages over those heretofore devised.

The described mode of adapting a single cylinder or vessel A, to form the oil-receptacle and gas-chamber entire, together with the method of arranging the same within the tank, conduces to cheapness and compactness.

The carburetter A is exposed, at top, to the external air, which effects the condensation of such vapor as may have a tendency so to do, and thus permit only perfect vapor to pass into the gas-pipe, condensation in the latter being thereby prevented.

By surrounding the carburetter with two distinct bodies of water, separated by an air-space, as described, the contents of the carburetting-chamber are preserved at a proper and equable temperature, and are effectually protected against fire.

The arrangement of the carburetting-vessel A, within the open well of the annular air-holder, enables it to be inspected and removed without removing the air-holder from its position.

I do not claim a carburetting-vessel, immersed in or surrounded by water, nor the employment of deflecting-plates in the carburetting-liquid; but

I claim as new herein, and desire to secure by Letters Patent—

1. The combination and arrangement of the carburetting-vessel A with the cistern $B^3$ and annular air-holder C, so that its sides and bottom are surrounded with water, while its upper extremity is open to the atmosphere, and accessible through the central space of the air-holder, for inspection, and the application of warming-agents, when required, substantially as set forth.

2. A carburetting-apparatus, consisting of the concentric annular compartments $B^1$ $B^3$, and intervening air-space $B^2$, the annular air-holder C C', and the carburetting-vessel A, combined, arranged, and operating substantially as shown and described.

3. The arrangement, in combination with the central carburetting-vessel A, of the annular air-space $B^2$, intervening between the two annular water-chambers $B^1$ and $B^3$, substantially as and for the purpose set forth.

To the above specification of my improvement in carburetters, I have signed my name, this 29th day of July, 1868.

EDMON L. MIX.

Witnesses:
CHAS. D. SMITH,
JOHN A. WIEDERSHEIM.